(12) United States Patent
Gindele et al.

(10) Patent No.: US 11,441,757 B2
(45) Date of Patent: Sep. 13, 2022

(54) LIGHT CONVERSION DEVICES AND LIGHTING DEVICES

(71) Applicant: SCHOTT AG, Mainz (DE)

(72) Inventors: Frank Gindele, Schweitenkirchen (DE); Edgar Pawlowski, Stadecken-Elsheim (DE); Christian Rakobrandt, Schwindegg (DE); Christoph Stangl, Buch am Erlbach (DE); Thorsten Damm, Eltville am Rhein (DE)

(73) Assignee: SCHOTT AG, Mainz (DE)

( * ) Notice: Subject to any disclaimer, the term of this patent is extended or adjusted under 35 U.S.C. 154(b) by 42 days.

(21) Appl. No.: 16/989,663

(22) Filed: Aug. 10, 2020

(65) Prior Publication Data

US 2021/0054988 A1 Feb. 25, 2021

(30) Foreign Application Priority Data

Aug. 9, 2019 (DE) ...................... 10 2019 121 518.8

(51) Int. Cl.
*F21V 9/30* (2018.01)
*C09D 1/00* (2006.01)

(52) U.S. Cl.
CPC . *F21V 9/30* (2018.02); *C09D 1/00* (2013.01)

(58) Field of Classification Search
CPC ................................ F21S 41/176; F21K 9/64
See application file for complete search history.

(56) References Cited

U.S. PATENT DOCUMENTS

| | | | |
|---|---|---|---|
| 2012/0230007 A1* | 9/2012 | Kawakami | F21S 41/176 362/19 |
| 2015/0062953 A1 | 3/2015 | Woelfing | |
| 2015/0092392 A1 | 4/2015 | Woelfing | |
| 2017/0198876 A1 | 7/2017 | Boinet | |
| 2017/0210280 A1 | 7/2017 | Suzuki | |
| 2018/0059522 A1 | 3/2018 | Huang | |
| 2018/0245772 A1* | 8/2018 | Tomita | F21V 7/30 |
| 2019/0032878 A1 | 1/2019 | Muster | |
| 2020/0263850 A1 | 8/2020 | Kawaguchi | |
| 2021/0302003 A1* | 9/2021 | Goldmann | F21V 29/70 |

FOREIGN PATENT DOCUMENTS

| | | |
|---|---|---|
| CN | 106939991 | 7/2017 |
| DE | 102012005658 | 9/2013 |
| EP | 3184884 | 6/2017 |
| EP | 3203140 | 8/2017 |
| EP | 3396230 | 10/2018 |
| WO | 2017104167 | 6/2017 |
| WO | 2017111405 | 6/2017 |
| WO | 2017133809 | 8/2017 |
| WO | 2018153620 | 8/2018 |

* cited by examiner

*Primary Examiner* — Andrew J Coughlin
(74) *Attorney, Agent, or Firm* — Ruggiero McAllister & McMahon LLC

(57) ABSTRACT

Light conversion devices and lighting devices having such conversion devices are provided. The conversion device includes a light conversion element having a front side and a coating arrangement. The front side is configured to be illuminated with primary light and to emit secondary light having another wavelength or a wavelength range. The coating arrangement is on the front side and has at least one coating layer.

18 Claims, 4 Drawing Sheets

LIGHT CONVERSION DEVICES AND LIGHTING DEVICES

CROSS REFERENCE TO RELATED APPLICATIONS

This application claims benefit under 35 USC 119 of German application 10 2019 121 518.8 filed on Aug. 9, 2019, the entire contents of which are incorporated by reference.

BACKGROUND

1. Field of the Invention

The invention relates to a lighting device, a light conversion device, and methods for the production thereof.

2. Related Art

Lighting devices in different designs are known, such as, for example, so-called discharge lamps and halogen lamps. For various reasons—for example, in terms of energy efficiency or in order to provide lighting devices that require little space and, at the same time, preferably provide a high luminance—lighting devices based on laser light sources are of increasing interest. Usually, these are built in such a way that they comprise at least one laser light source, such as, for example, a laser diode, as well as a light conversion element.

The light conversion element serves for the purpose of receiving the light of the laser light source and for emitting it at another wavelength, because the light beamed from the laser light source or from the laser light sources usually does not have the desired color location, such as, for example, the color-neutral "white" color location or color coordinates. After it has been irradiated with the light of the laser light source or of the laser light sources—for example, light with a wavelength of 450 nm in the case of a blue laser, which is usually monochromatic—the light conversion element is able to convert this light partially or completely into one or more other wavelengths or into a specific wavelength spectrum. Through additive color mixing of the scattered light and of the converted light, it is possible to produce a light image that has a desired or specified color coordinates.

The light conversion element is also referred to as a converter, such as, for example, Ce:YAG, luminescent element, or (English) phosphor, whereby the term "phosphor" is not intended to be understood here in the sense of the chemical element of the same name, but rather relates to the property of this substance to luminesce. In the sense of the present disclosure, therefore, the term "phosphor" is always understood to mean a luminescent substance, and not the chemical element of the same name, unless explicitly stated otherwise.

Such lighting devices based on laser light sources are especially important, because, in this way, it is possible to achieve a high light density (English: luminance). This is relevant, in particular, for applications in the automobile sector.

It is also often a goal to achieve an especially high luminance especially in the case of low laser power in order to achieve not only a high luminance, but also to keep the energy consumption as small as possible. This can be achieved by producing a light spot only of small dimension, such as, for example, of only small diameter—for example, smaller than 500 micrometers—but with a correspondingly high luminance.

The phosphor used can, on the one hand, be operated in transmittance mode and, on the other hand, also in remission (reflectance) mode. In remission use, the phosphor can be cooled from the back side.

In known laser white light sources, the color coordinates realized are often "blue-shifted," so that the color coordinate value realized occasionally cannot be used or else a desired color coordinate value cannot be realized.

US 2017/0210280 A1 describes a headlight device for vehicles, which is configured so that it is possible to adjust different light distribution patterns with low energy consumption. Described in US 2017/0198876 A1 is a lighting device that is equipped with a curved light conversion element as well as a vehicle headlight comprising such a lighting device.

A method for controlling a motor vehicle headlight and a corresponding motor vehicle headlight are disclosed in EP 3 184 884 A1. The motor vehicle headlight comprises at least one laser diode and a light conversion element associated with the laser diode. Regions of the light conversion element that correspond to different regions of the light image can be illuminated by a laser beam of the laser diode periodically and with different intensity, so that the lighting intensity can be adjusted in different regions of the light image by way of the relative illumination time and/or by way of the different light intensities of the laser diode in these regions.

WO 2017/133809 A1 describes an illumination device for the emission of illumination light. The illumination device comprises an LED for the emission of LED radiation and a laser for the emission of laser radiation as well as a luminescent element for at least partial conversion of the LED radiation and the laser radiation into a conversion light. During operation of the lighting device, the regions overlap at least partially on the luminescent element on which LED light and laser light are irradiated.

EP 3 203 140 A1 describes a lighting device for a vehicle and an associated operating method. The lighting device comprises a pixel light source as well as an anamorphic element that can be illuminated by the pixel light source at least partially with a light distribution.

CN 106939991 A describes a vehicle headlight that is based on the laser excitation of a fluorescent optical fiber comprising a laser module, an optical fiber, and a fluorescent optical fiber. In this way, a vehicle headlight with a compact construction is provided. Described in WO 18 153 620 A is, among other things, a converter arrangement with multiple layers. Used as the topmost layer is a $MgF_2$ layer, which is intended to reduce the reflectance. In addition, a second layer is used, which serves as an adaptive layer and is situated between the first layer and the dichroic mirror that is used. The phosphor is situated below the layer packets. The purpose of the application is to achieve an increase in efficiency of approximately 5-6%. Furthermore, in this arrangement, the excitation wavelength (blue) is to be maximally allowed to pass through.

Dielectric AR coatings of ceramics can improve the outcoupling efficiency, because the reflectance is reduced at the transition between the ceramic and air. US 2018/0059522 A1 describes a converter arrangement with at least one filter layer and at least one single layer. WO 2017/111405 A1 describes a phosphor plate arrangement, an arrangement for the emission of light, as well as a vehicle headlight that comprises these arrangements. WO 2017/104167 A1 describes an illumination device and a vehicular headlight. The illumination device comprises a device for the emission of light using a luminescent substance that emits light when it is excited by light of the laser element as well as a movable mirror that moves continuously according to a predetermined routine.

However, it has been found that, in terms of the correct or improved color coordinates, the known lighting devices are worthy of further improvement.

SUMMARY

Therefore, the object of the invention is to present a lighting device and a light conversion device suitable for it as well as corresponding methods for their production and adjustment, which make it possible to produce a light spot that has an adjusted color coordinate or a corrected color coordinate or an adjustable color coordinate. This should preferably be made possible for high or very high luminance and preferably for white light and still more preferably for light that is to be emitted in the ECE color coordinate field.

Provided in accordance with the invention is a light conversion device, in particular for a lighting device. The light conversion device comprises a light conversion element, wherein the light conversion element has a front side and is configured to be illuminated with primary light on the front side, and, on the same front side, to emit secondary light having another wavelength or having another wavelength range. The light conversion element is therefore designed, in particular, for a remission operation (reflectance operation). This remission arrangement also has advantages in terms of structural engineering, since it is thereby possible to cool the light conversion element from the back side by a base body designed as a heat sink, for example.

The light conversion device further comprises a coating arrangement, which is arranged on the front side of the light conversion element and has at least one coating layer. In other words, a coating, which is yet to be described more precisely in detail, is applied to the front side of the light conversion element and influences and, in particular, improves the optical properties of the light conversion device.

The light conversion device is configured in such a way that, depending on the direction of the incident or emitted beam of light, respectively, into or out of the light conversion element, it has a differing degree of reflectance.

The degree of reflectance for an angle of incidence of 60 degrees to the normal line in this case differs preferably by at least a factor of two on average and, in particular, by a factor of three or more from the degree of reflectance for an angle of incidence of 30 degrees or less to the normal line. The normal line is here the line perpendicular to the front side of the light conversion element. The degree of reflectance for an angle of incidence of 60 degrees, for example, can be greater than that for an angle of incidence or an angle of emission of 30 degrees or less.

The light conversion device has, for example, a first degree of reflectance for incident or emitted radiation and this degree of reflectance of the light conversion device is dependent on the wavelength of the incident beam of light or of the emitted beam of light. Thus, it is especially advantageous when the degree of reflectance is approximately constant over the wavelength range of the incident beam of primary light and when the degree of reflectance in the wavelength range of the emitted beam of secondary light is likewise approximately constant or when the respective degrees of reflectance lie below an experimentally obtainable threshold value for the degree of reflectance.

For an angle of incidence or an angle of emission of 30 degrees or less to the normal line at a wavelength of around 450 nm, in particular between 440 and 460 nm, the degree of reflectance of the light conversion device can be at least twice as large as the degree of reflectance in the wavelength range between 500 to 700 nm, preferably three times as large, more preferably five times as large. Furthermore, it is advantageous when the degree of reflectance of the light conversion device in the wavelength range of less than 450 nm further increases. In other words, in particular, on account of the coating arrangement with the at least one coating layer, the light conversion device in configured in such a way that it affords the aforementioned degrees of reflectance. The coating arrangement can therefore exert an influence on the corresponding reflectance behavior of the light conversion device, in particular on the front side of the light conversion device on which the coating arrangement is applied.

Thus, the light conversion device can be adjusted by means of the configuration of the coating arrangement in such a way that the aforementioned degrees of reflectance can be achieved—that is, for an angle of incidence of 60 degrees to the normal line in a range between 50 and 70 degrees to the normal line, for example, at a wavelength in the range between 440 and 460 nm, a first degree of reflectance of 2%, for example, is achieved—and, at the same time, for an angle of emission of 30 degrees or less to the normal line—that is, for example, for 20 degrees to the normal line or for 10 degrees to the normal line or else in the direction of the normal line, that is, 0 degrees to the normal line, and in the wavelength range between 440 and 700 nm, preferably 500 to 700 nm, a second degree of reflectance of 2%, for example, can be achieved.

The light conversion device can further be adjusted by means of the configuration of the coating arrangement in such a way that the degree of reflectance for an angle of incidence or an angle of emission in the range of 60 degrees to the normal line, that is, in particular in the range of 50 to 70 degrees to the normal line, preferably 55 to 65 degrees, at a wavelength around 450 nm, that is, in particular between 440 and 460 nm, is half as large as the degree of reflectance in the wavelength range between 500 to 700 nm and more preferably has only a third of the degree of reflectance of the wavelength range between 500 to 700 nm.

The light conversion element can be prepared to receive blue primary light on its front side. In other words, the coating arrangement disposed on the front side of the light conversion element is adjusted so as to allow the blue primary light "to pass through," that is, in particular, so as to be especially transmissive, particularly selectively transmissive for it, to convert the blue primary light to white secondary light, and to emit the white secondary light on its front side, whereby, in particular, it is possible to provide the blue primary light in a narrow wavelength range around 450 nm.

Accordingly, it is possible using the presented light conversion device to achieve an especially high luminance, even and especially for low laser power, so as to obtain not only a high luminance, but also to keep the energy consumption as low as possible. For this purpose, it is also possible to provide a light spot of only a small dimension, such as, for example, of only a small diameter, but with correspondingly high luminance. The light conversion device as well as the lighting device comprising it are thus suitable, in particular, for applications in the automobile sector, in the aircraft sector, in medical lighting, and in the general lighting sector, such as, for example, for stage lights and spotlights.

The at least one coating layer of the coating arrangement comprises preferably one of the materials $SiO_2$, $TiO_2$, $ZrO$ or $Al_2O_3$. These coating materials have proven themselves to be especially advantageous in order to obtain the desired properties, in particular in regard to the degree of reflectance.

The coating arrangement on the front side of the light conversion element comprises preferably two coating layers or even more than two coating layers. This becomes especially interesting when the coating layers of the coating arrangement are composed of different materials, such as, for example, a layer of $SiO_2$, a layer of $TiO_2$, and/or a layer of $Al_2O_3$. In an exemplary embodiment, it is possible for the coating arrangement to comprise even 5, 8, or 10 coating layers. In a specific example, it is possible to provide a YAG as the light conversion element, on which the coatings $TiO_2$, $SiO_2$, $TiO_2$, $ZrO$, and $SiO_2$ are arranged in succession.

The coating layer or the coating layers of the coating arrangement preferably have a thickness of at least 10 nm, further preferred at least 15 nm, further preferred at least 20 nm. Furthermore, the thickness of the respective coating layer can be at most 120 nm, preferably at most 60 nm.

Furthermore, the coating arrangement can have a total thickness of at least 80 nm, preferably at least 120 nm, more preferably at least 150 nm, and at most 500 nm.

The coating layer or the coating layers are applied on the light conversion element, in particular, by means of a coating process. In this case, it is advantageous when the front side of the light conversion element is covered completely by the coating arrangement.

Furthermore, the light conversion device can comprise a base body on which the light conversion element is placed on a front side. The base body can serve, for example, to fasten or to fix in place the light conversion device in a lighting device and, for this purpose, can have fastening means. In addition, the base body can be designed as a heat sink, whereby the light conversion element is placed on the front side of the base body and the base body can radiate heat toward its back side by means of an appropriately designed heat sink or by means of cooling ribs or the like, for example. The light conversion element therefore faces with its back side the front side of the base body, whereas the front side of the light conversion element faces away from the base body.

The light conversion element can be arranged directly or indirectly on the base body. In the case that the light conversion element is placed indirectly on the base body, it is possible, for example, for the light conversion device to comprise an intermediate element that is placed on the base body and on which, in turn, the light conversion element is arranged. Such an intermediate element can also be designed as an alignment element in such a way that it enables an alignment of the light conversion element relative to the primary light and/or an alignment of the secondary light relative to a downstream optics.

The invention further describes a lighting device comprising a light conversion device with a light conversion element and a coating arrangement, wherein the light conversion element has a front side and is configured so as to be illuminated with primary light on the front side, and, on the same front side, to emit secondary light having another wavelength or a wavelength range, with a coating arrangement that is arranged on the front side of the light conversion element and has at least one coating layer, and with a light emitting unit, which is configured to emit the primary light for illumination of the front side of the light conversion element.

The lighting device can further comprise an optics arranged downstream of the light conversion element for capturing, in particular, for shaping secondary light, and for emission of the secondary light.

The light emitting unit preferably comprises a laser light source, which is configured to emit the primary light for illumination of the light conversion element. The light emitting unit can comprise a light guide, in particular, a fiber optic light guide, which is configured to emit the primary light for illumination of the light conversion element. Additionally or alternatively, the light emitting unit can comprise a lens.

The light emitting unit can be arranged in such a way that the primary light is radiated laterally onto the light conversion element. The primary light can, in particular, be radiated along an optical axis, which, in relation to an axis of a normal line of the light conversion element and/or in relation to an optical axis of the secondary light, has an angle of greater than 30 degrees, preferably of greater than 45 degrees, more preferably of 60 degrees, with, as needed, a scattering range around the optical axis. In other words, in one example, the primary light can be radiated at an angle of 60 degrees to the normal line and the secondary light can be emitted from the light conversion element in an angular range of 30 degrees to 0 degrees to the normal line. The scattering range of the irradiation can be, for example, ±5 degrees around the optical axis of the primary light, more preferably ±10 degrees around the optical axis of the primary light.

The light emitting unit is preferably configured and/or arranged so that a primary light receiving surface is provided on the front side, within which the light conversion element is illuminated with the primary light. The primary light receiving surface is preferably less than 1 square millimeter, more preferably less than 0.5 square millimeter, especially preferred less than 0.2 square millimeter.

The light emitting unit preferably provides a bundled primary light, preferably with a wavelength around 450 nm, such as, for example, in a range from 440 to 460 nm. The light conversion element provides secondary light when it is illuminated by the light emitting unit. In other words, the light conversion element converts the incident beam of primary light to the emitted beam of secondary light. The secondary light preferably comprises a wavelength range in the visible light region, for example in a wavelength range from 440 to 700 nm, preferably 500 to 700 nm, but at least 550 to 650 nm.

On the front side of the light conversion element, the coating arrangement preferably comprises more than one coating layer. In other words, a second coating layer is arranged on a first coating layer and preferably, on the second coating layer, a third coating layer, etc. is arranged. For example, in this way, five coating layers or more are arranged on the front side of the light conversion element.

In this case, the coating layer has or each of the coating layers of the coating arrangement preferably has a thickness of at least 10 nm, preferably at least 15 nm, more preferably at least 20 nm. On the other hand, the coating layer has or the coating layers of the coating arrangement have a thickness of up to 120 nm, preferably of up to 60 nm, such as, for example, around 30 nm±15 nm.

Moreover, the coating arrangement can have a total thickness of at least 80 nm, preferably at least 120 nm, more preferably at least 150 nm, and at most 500 nm.

It is especially advantageous for the lighting device when the emitted secondary light in an operating state, in particular in a hot operating state, of the lighting device lies in the ECE range.

Presented in the scope of the invention is also a method for producing a light conversion device, wherein the method comprises the provision of a light conversion element, wherein, in particular, the light conversion element is introduced on a base body, and further the application of at least one coating layer on a front side of the light conversion element in such a manner that, for light of a specific wavelength, which is radiated along an optical axis onto the light conversion device, the light conversion device has a first degree of reflectance and further in such a manner that, for light of another wavelength or of a wavelength range, the light conversion device has a second degree of reflectance.

Lying in the scope of the invention is also a method for producing a lighting device, comprising the provision of a light conversion device, the application of at least one coating layer on a front side of a light conversion element in such a manner that, for light of a specific wavelength, which is radiated along an optical axis onto the light conversion device, the light conversion device has a first degree of reflectance and, for light of another wavelength or of a wavelength range, the light conversion device has a second degree of reflectance, and the arrangement of a light emitting unit for irradiation of the light conversion device with primary light at an angle to the normal line, wherein the angle is preferably 60 degrees±10 degrees.

The invention will be explained in detail below on the basis of figures.

DETAILED DESCRIPTION

Figure 1:
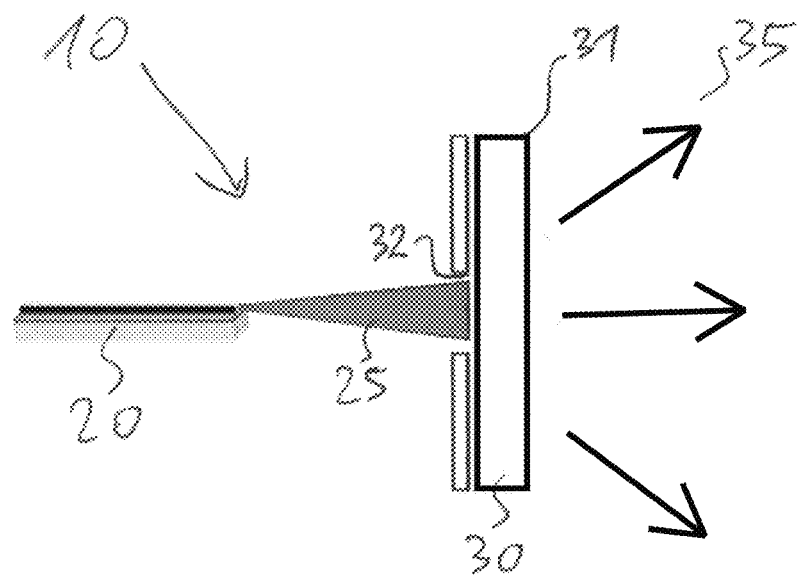
FIG. 1 a lighting device known from the prior art, in which a light conversion element (converter) is utilized in transmittance operation, FIG. 2 a lighting device in which a converter is utilized in remission operation, FIG. 3 a lateral sectional view of a first embodiment of a light conversion device with a light conversion element and a coating arrangement, FIG. 4 a lateral sectional view of a second embodiment of a light conversion device with a light conversion element and an alternative coating arrangement as well as with a base body, FIGS. 5-7 results for the degrees of reflectance that can be achieved by means of the invention.

FIG. 1 shows a known lighting device 10, which is designed for transmittance operation. The lighting device 10 comprises a light emitting unit 20, with which primary light 25 is radiated onto the back side 32 of a light conversion element 30. The light conversion element 30 accordingly receives the primary light 25 on the back side 32 and emits secondary light 35 on the front side 31.

Figure 2:
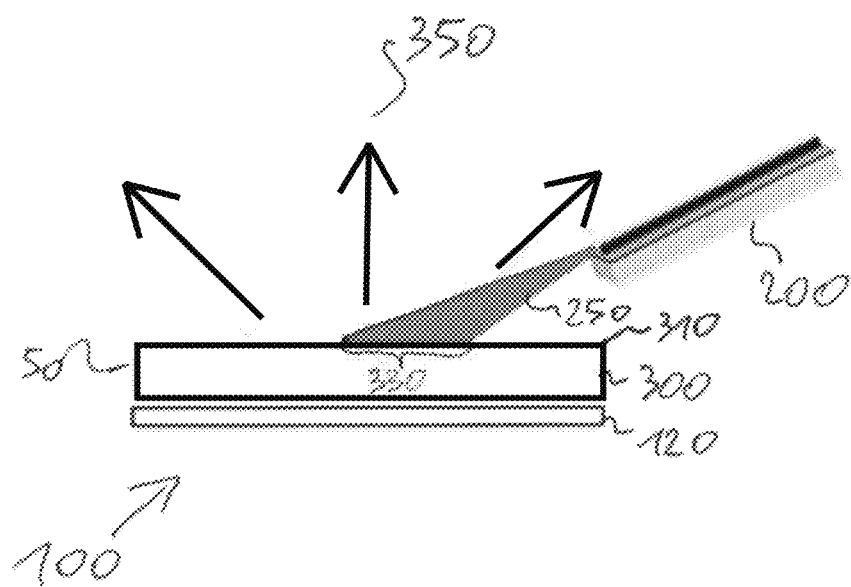

FIG. 2 shows another lighting device 100, which is designed for remission operation or reflectance operation. The light emitting unit 200 radiates primary light 250 onto the front side 310 of the light conversion element 300, whereby the front side is illuminated in the area of a primary light receiving surface 330. The light conversion element 300 emits the secondary light 350 on the front side 310, preferably in the area of the entire front side 310 or in the area of a secondary light emitting surface 340.

Figure 3:
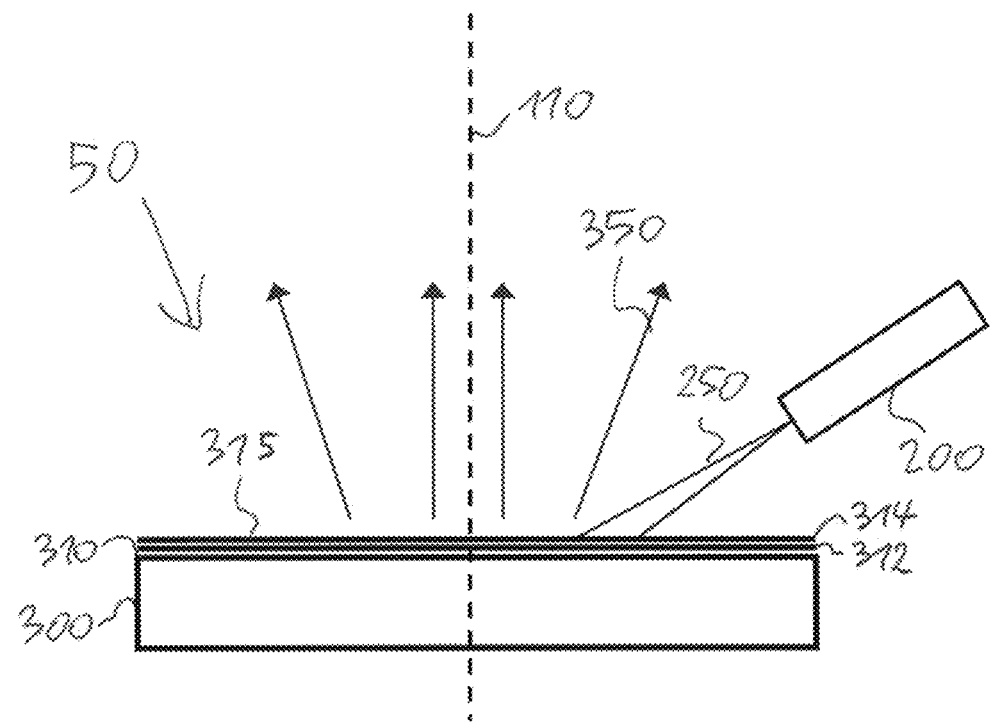

FIG. 3 shows a first embodiment of a light conversion device 50, which can be used, for example, for a lighting device 100, whereby the light conversion device 50 comprises a light conversion element 300 and, arranged on the front side 310 of the light conversion element 300, coating layers 312, 314 of a coating arrangement 315. For better understanding, the coating layers 312, 314 are illustrated at a distance from one another. However, it is clear that the individual coating layers 312, 314 are arranged or affixed or placed on one another in a fixed and direct manner as well as that the first coating layer 312 is also arranged or affixed or placed in a fixed and direct manner at the front side 310 of the light conversion element 300. In other words, the light conversion element 300 is coated on its front side 310 first of all with the first coating layer 312 and, namely, done so in a fixed and direct manner, and then coated on the first coating layer 312 with the second coating layer 314.

The incident light 250 is then directed at the topmost coating layer 314 at an angle so that the reflectance properties of the light conversion device 300 are dependent especially on this coating layer 314, although a dependence on the other elements of the light conversion device 50 is also to be taken into account for the incident primary light 250. For example, for the angle of entry of the primary light 250, an angle of 60° to the normal line 110 is chosen. After intensive research and the surprising selection of coating materials for the coating layer 314, it was possible to find various combinations of materials that have been found to be especially advantageous for the light conversion device 50 (see FIGS. 5 to 7).

The incident light 250 passes through the first coating layer 312 and into the light conversion element 300 via its front side 310, where it is converted to the secondary light 350. The secondary light 350 then reenters the front side 310 from the light conversion element 300 at a flatter angle to the normal line 110 and passes through the coatings 312 and 314 in reverse sequence. The refractive properties for the secondary light 350 can therefore, as needed, differ markedly from those for the primary light 250, this also being exploited in a targeted manner in the sense of the invention. For example, the secondary light 350 exits the light conversion device 50 in a larger angle range, such as, for example, in an angle range from 0° to the normal line, that is, in the direction of the normal line, up to, on both sides, 30° or even 45° to the direction of the normal line.

In an especially advantageous embodiment of the invention, the angle range for the exit of the secondary light 350 can be limited or adjusted by means of the coating arrangement 315. Thus, it is possible to design a coating arrangement 315 in terms of the coating materials and the individual coating thicknesses such that the degrees of reflectance for different angles turn out to be different, and it is thus possible to establish a sharper or more defined drop-off in the luminance toward the edge. Thus, it is ultimately possible, as needed, to influence specifically the outline of a headlight cone for a lighting device in that the secondary light is limited to a specific exit angle range, such as, for example, the range from 0° to the normal line up to 30° to the normal line on both sides.

Figure 4:
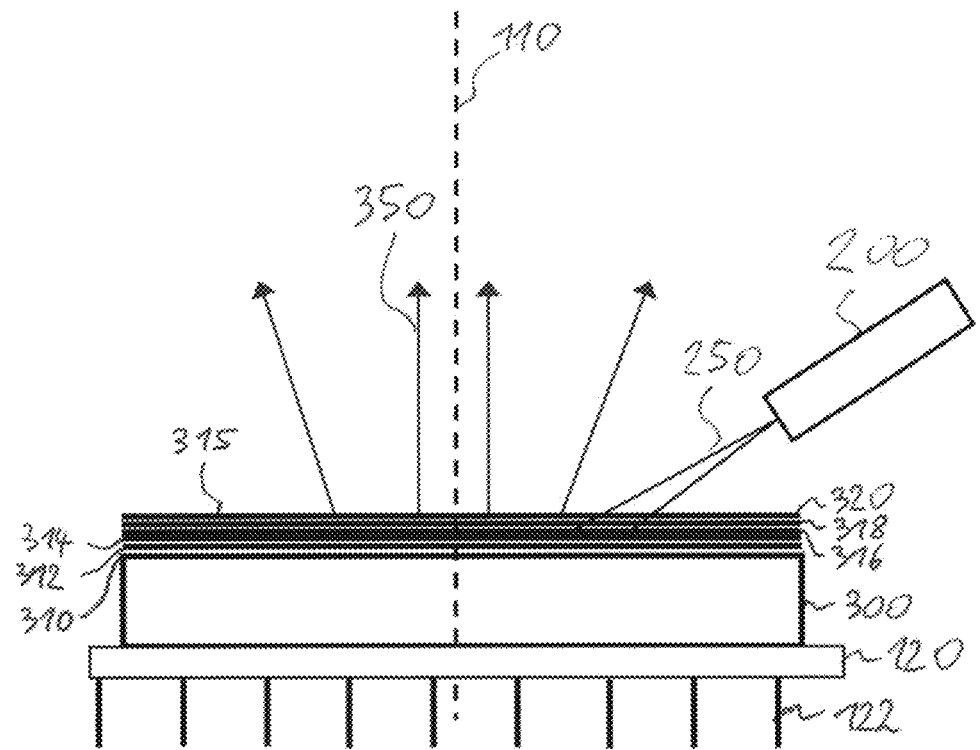

FIG. 4 shows another embodiment of a light conversion device 50, in which a light conversion element 300 is placed on a base body 120. The base body 120 is designed as a heat sink and has for this purpose, by way of example, cooling elements or cooling ribs 122. Furthermore, on the back side of the base body 120, it is possible for another form of cooling, such as, for example, a fluid cooling or liquid cooling, to be arranged in order to dissipate the heat from the light conversion device 50.

Also arranged on the light conversion element 300 in FIG. 4 is another embodiment of the coating arrangement 315. In other words, on its front side 310, there is introduced onto the light conversion element 300 a coating arrangement 315, which, in the example shown, comprises five coating layers 312, 314, 316, 318, and 320. The five coating layers 312, 314, 316, 318, and 320 comprise different coating materials, whereby a given coating material can be present in a plurality of coating layers when, for example, a different kind of coating material is placed in between. For example, the light conversion element 300, a YAG, can comprise a first coating layer 312, $TiO_2$, in a thickness of 28 nm, a second coating layer 314, $SiO_2$, in a thickness of 41 nm, a third coating layer 316, again $TiO_2$, in a thickness of 38 nm, a fourth coating layer 318, $SiO_2$, in a thickness of 80 nm, and a fifth, outer coating layer 320, $TiO_2$, in a thickness of 10 nm. The aforementioned coating arrangement 315 and the number and thickness of the coating layers 312, 314, 316, 318, 320 are intended to be understood only by way of example. It is also possible to provide fewer or even more coating layers 312, 314, 316, 318, 320, such as, for example, one, two, or three coating layers. Moreover, the thicknesses of individual coating layers can each vary, in particular between 20 and 120 nm.

In the example shown, the primary light 250 is irradiated in an angle range of 60±5 degrees to the normal line 110, that is, with a mean angle of 30±5 degrees to the plane of the front side 310. The primary light 250 impinges first of all on the outer coating layer 320, which, in this example, is the fifth coating layer 320, and passes through the applied coatings in succession. Over the entire coating thickness, including the front side 310 as boundary surface, for the incident primary beam of light 250, there thus results a total degree of reflectance for the amount of light that does not enter the light conversion element 300, but rather is reflected and thus is not available for the production of secondary light 350. It is especially advantageous when this amount of the primary beam of light 250 that is not available is less than 5%, further advantageously less than 2%, still further advantageously less than 1% of the irradiated amount of the primary light 250.

In the example referred to in FIG. 4, the secondary light 350 is emitted in an angle range of 0±30 degrees to the normal line 110, although this can also be 0±45 degrees or 0±15 degrees. The latter can also be influenced by the skillful arrangement and choice of the coating materials. The secondary light 350 is produced in the light conversion element 300 after excitation by the primary beam of light 250 and exits toward the front side 310, whereby it passes through the five coating layers 312, 314, 316, 318, and 320 in succession. During the exit of the secondary beam of light 350, it is also possible for a reflectance to occur at the optical boundary of the front side 310 of the light conversion element 300, whereby the reflectance is influenced by the coating.

The person skilled in the art would then proceed from the assumption that additional coatings on the front side 310 of the light conversion element 300 are rather likely to increase the reflectance. It would therefore be assumed that the placement of a coating arrangement 315 on the front side 310 of a light conversion element 300 is rather likely to be disadvantageous. However, in actuality, this is a complex problem, which, besides the total reflectance of the incident primary beam of light 250, needs to take into account the wavelengths used and the angles used for the incident and emitted beams of light, and also the operating temperature of the light conversion device, the light flux of the primary beam of light 250, and also the spot size 330 of the primary beam of light 250.

Figure 5:
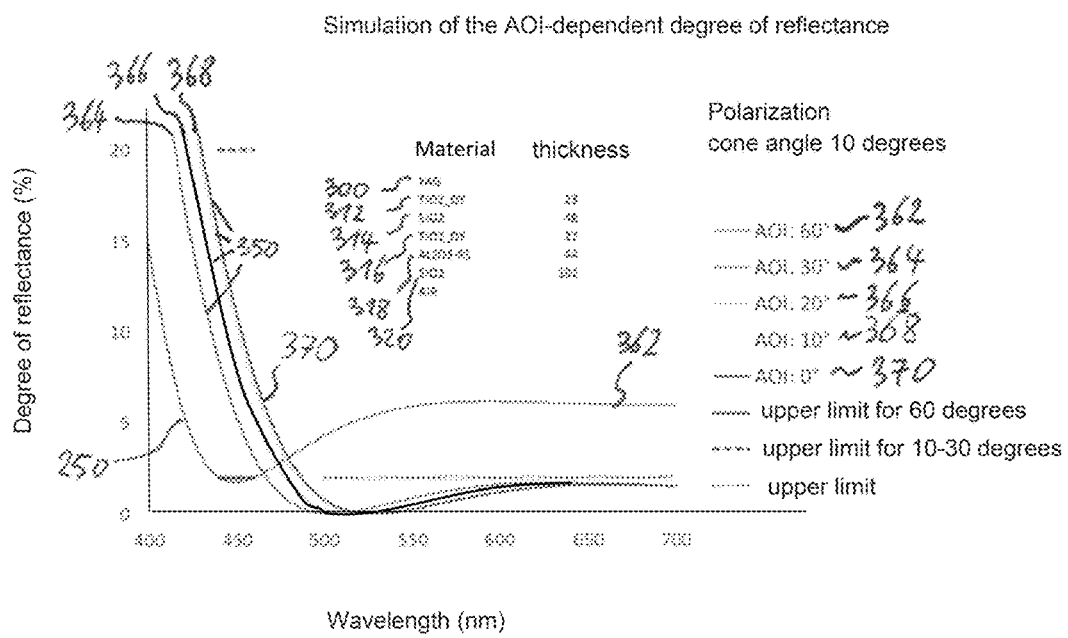

FIG. 5 shows a first simulation for the total degree of reflectance of the arrangement composed of the light conversion element 300 with the coating arrangement 315 applied on the front side 310 (see FIGS. 3 and 4) for various angles of 0, 10, 20, 30, and 60 degrees to the normal line 110. On the light conversion element 300, the coating arrangement comprises a first coating layer 312, $TiO_2$, in a thickness of 23 nm, a second coating layer 314, $SiO_2$, in a thickness of 48 nm, a third coating layer 316, $TiO_2$, in a thickness of 22 nm, a fourth coating layer 318, $Al_2O_3$, in a thickness of 44 nm, and a fifth or outer coating layer 320, $SiO_2$, in a thickness of 102 nm. The total thickness of the coating arrangement 315 on the front side 310 of the light conversion element 300 is thus 239 nm.

The degree of reflectance is to be taken from the y-axis of FIG. 5 and, as can be seen, is dependent essentially on the wavelength of the beam of light in question, which is to be taken from the x-axis. It is assumed that the incident primary beam of light 250 is irradiated in the wavelength range from 440 to 460 nm, that is, at 450±10 nm at an angle of around 60 degrees, such as, for example, 60±5 degrees, or, as presented in FIG. 5, 60±10 degrees. For the incident primary beam of light 250, there thus results in this wavelength range a targeted degree of reflectance of less than 2%.

It is further assumed that the emitted secondary beam of light 350 is emitted in a wavelength range from 500 to 700 nm in an angle range from 0 to 30 degrees to the normal line 110. For this wavelength range, too, there results, under the conditions stated above, a degree of reflectance for the secondary beam of light 350 of less than 2%.

Figure 6:
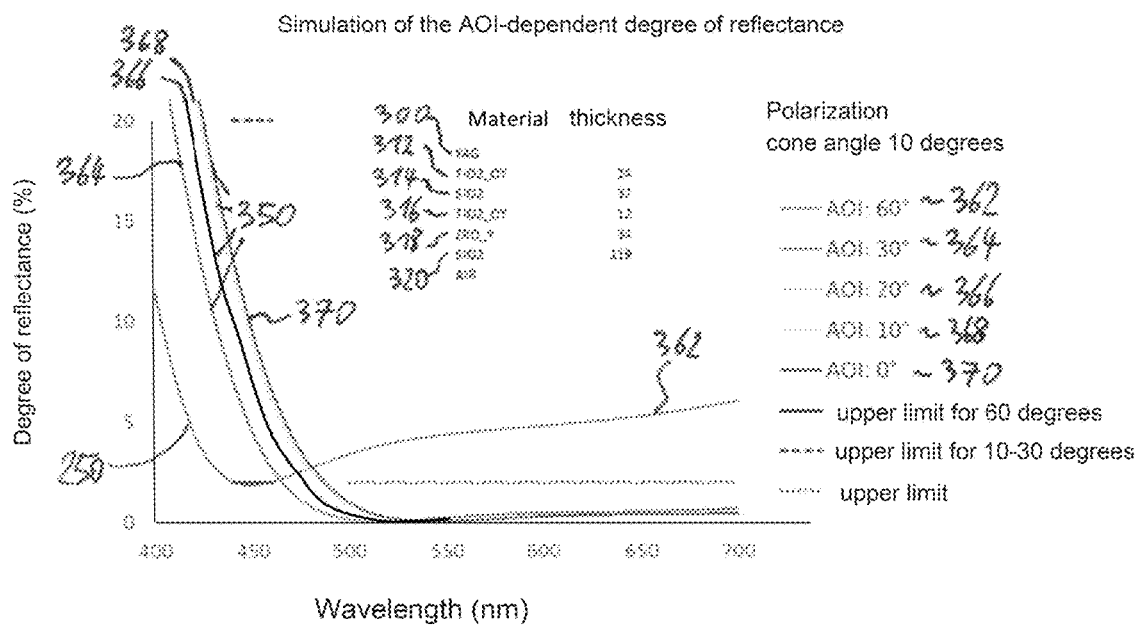

FIG. 6 shows another example of a simulation for the degree of reflectance (y-axis) as a function of the wavelength (x-axis) for various angles of 0, 10, 20, 30, and 60 degrees to the normal line 110. The coating arrangement 315 (see FIGS. 3 and 4) applied on the front side 310 of the light conversion element 300 comprises a first coating layer 312, $TiO_2$, in a thickness of 24 nm, a second coating layer 314, $SiO_2$, in a thickness of 37 nm, a third coating layer 316, $TiO_2$, in a thickness of 12 nm, a fourth coating layer 318, $ZrO$, in a thickness of 34 nm, and a fifth or outer coating layer 320, $SiO_2$, in a thickness of 119 nm. The total thickness of the coating arrangement is thus 226 nm. As described in connection with FIG. 5, it is assumed that the primary light 250 is irradiated at an angle of 60±10 degrees at a wavelength of 450±10 nm. For this range, there results a desired low degree of reflectance of less than 2%. The emitted secondary beam of light 350 is emitted in a wavelength range from 500 to 700 nm in an angle range of 0 to 30 degrees to the normal line 110. For this wavelength range, too, there results, under the conditions stated above, a degree of reflectance of less than 2% for the secondary beam of light 350, as can be seen from FIG. 6.

Figure 7:
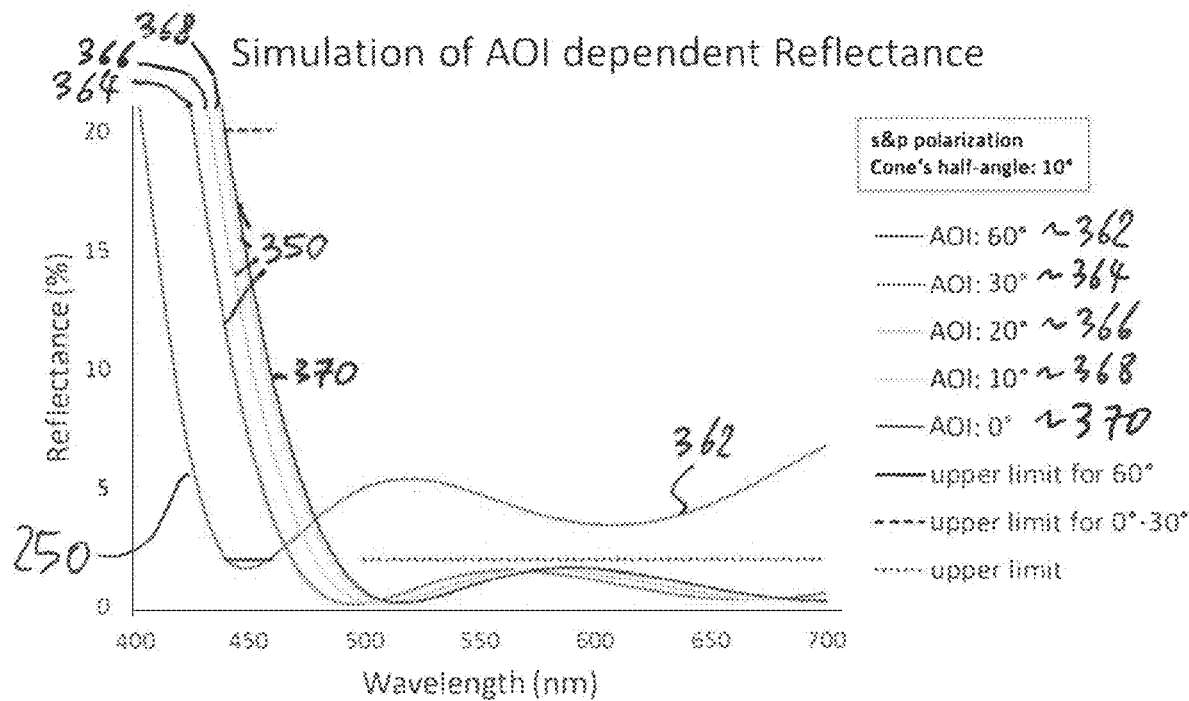

Finally, FIG. 7 shows another example for a simulation of the total degree of reflectance (y-axis) of the arrangement composed of the light conversion element 300 with the coating arrangement 310 applied on the front side 310 (see FIGS. 3 and 4) as a function of the wavelength (x-axis) for various angles of 0, 10, 20, 30, and 60 degrees. The coating arrangement applied on the front side 310 of the light conversion element 300 comprises a first coating layer 312, $TiO_2$, in a thickness of 13 nm, a second coating layer 314, $SiO_2$, in a thickness of 39 nm, a third coating layer 316, TiO$_2$, in a thickness of 17 nm, a fourth coating layer 318, SiO$_2$, in a thickness of 60 nm, a fifth coating layer 320, TiO$_2$, in a thickness of 10 nm, a sixth coating layer 322, SiO$_2$, in a thickness of 10 nm, a seventh coating layer 324, TiO$_2$, in a thickness of 19 nm, an eighth coating layer 326, SiO$_2$, in a thickness of 47 nm, a ninth coating layer 328, TiO$_2$, in a thickness of 32 nm, and a tenth outer coating layer 329, SiO$_2$, in a thickness of 131 nm. In this example, the total thickness of the coating arrangement 315 with its ten coating layers 312 to 329 is thus 378 nm. As described in connection with FIGS. 5 and 6, it is assumed that the primary light 250 is irradiated at an angle of 60±10 degrees at a wavelength of 450±10 nm. For this range, there results a desired low degree of reflectance of less than 2%. The emitted secondary beam of light 350 is emitted in a wavelength range from 500 to 700 nm in an angle range from 0 to 30 degrees to the normal line 110. For this wavelength range, too, there results, under the conditions stated above, a degree of reflectance of less than 2% for the secondary beam of light 350, as can be taken from FIG. 7.

It is self-evident for the person skilled in the art that the above-described embodiments are to be understood as being given by way of example and that the invention is not limited to them, but rather they can be varied in diverse ways without leaving the protective scope of the claims. Furthermore, it is self-evident that the features, regardless of whether they are disclosed in the description, the claims, the figures, or elsewhere, define, also taken individually, key constituent parts of the invention, even when they are described jointly with other features, and can thus be regarded as having been disclosed independently of one another. In all figures, the same reference signs represent the same objects, so that descriptions of objects that are mentioned as needed in only one figure or, in any case, not in regard to all figures, can also be extended to figures for which the object in the description is not explicitly described. The description of features of one exemplary embodiment applies appropriately in each case also to the other exemplary embodiments.

LIST OF REFERENCE NUMBERS:

| | |
|---|---|
| 10 | lighting device |
| 20 | light emitting unit |
| 25 | primary light |
| 30 | light conversion element |
| 31 | front side |
| 32 | back side |
| 35 | secondary light |
| 50 | light conversion device |
| 100 | lighting device |
| 110 | normal line |
| 120 | base body |
| 122 | cooling element or ribs |
| 200 | light emitting unit |
| 250 | primary light |
| 300 | light conversion element |
| 310 | front side |
| 312 | first coating layer |
| 314 | second coating layer |
| 315 | coating arrangement |
| 316 | third coating layer |
| 318 | fourth coating layer |
| 320 | fifth coating layer |
| 322 | sixth coating layer |
| 324 | seventh coating layer |
| 326 | eighth coating layer |
| 328 | ninth coating layer |
| 329 | tenth coating layer |
| 330 | primary light receiving surface |

-continued

LIST OF REFERENCE NUMBERS:

| | |
|---|---|
| 340 | secondary light emitting surface |
| 350 | secondary light |

What is claimed:

1. A light conversion device, comprising:
a light conversion element having a front side; and
a coating arrangement on the front side, the coating arrangement having at least one coating layer,
wherein the light conversion element is configured, on the front side, to be illuminated with primary light and, on the front side, to emit secondary light having another wavelength or a wavelength range from the primary light,
wherein the light conversion device has a differing degree of reflectance depending on a direction of an incident beam of the primary light or an emitted beam of the secondary light, and
wherein the degree of reflectance for an angle of incidence of the primary light or an angle of emittance of the secondary light in a range from 60 degrees to a normal line at a wavelength of 440 nm to 460 nm is at most half as large as the degree of reflectance in the wavelength range between 500 to 700 nm.

2. The light conversion device of claim 1, wherein the differing degree of reflectance is a function of a wavelength of the primary or secondary light.

3. The light conversion device of claim 1, wherein the degree of reflectance for an angle of incidence of the primary light or an angle of emittance of the secondary light of 60 degrees to a normal line deviates on average by at least a factor of two from a degree of reflectance for the angle of incidence of 30 degrees or less to the normal line.

4. The light conversion device of claim 1, wherein the degree of reflectance for an angle of incidence of the primary light or an angle of emittance of the secondary light of 30 degrees or less to a normal line at a wavelength of 450 nm is at least twice as large as the degree of reflectance in the wavelength range between 500 to 700 nm.

5. The light conversion device of claim 1, wherein the front side is configured convert the primary light that is blue to the secondary light that is white.

6. The light conversion device of claim 1, wherein the at least one coating layer comprises a material selected from a group consisting of SiO$_2$, TiO$_2$, Al$_2$O$_3$, and any combinations thereof.

7. The light conversion device of claim 1, wherein the at least one coating layer comprises a plurality of coating layers.

8. The light conversion device of claim 7, wherein the plurality of coating layers comprises layers of different materials and one layer comprising a material selected from a group consisting of SiO$_2$, TiO$_2$, Al$_2$O$_3$, and any combinations thereof.

9. The light conversion device of claim 1, wherein the at least one coating layer has a thickness of at least 10 nm and at most 120 nm, and wherein the coating arrangement has a total thickness of at least 80 nm and at most 500 nm.

10. The light conversion device of claim 1, wherein the at least one coating layer completely covers the front side.

11. The light conversion device of claim 1, further comprising a base body having a cooling element, wherein the base body is on a back side of the light conversion element.

12. A lighting device, comprising:
a light conversion device having a light conversion element and a coating arrangement on a front side of the light conversion element; and
a light emitting unit configured to emit primary light on front side of the light conversion element, wherein the light conversion element is configured to emit secondary light from the wavelength having another wavelength or a wavelength range from the primary light,
wherein the coating arrangement has at least one coating layer,
wherein the light conversion device has a differing degree of reflectance depending on a direction of an incident beam of the primary light or an emitted beam of the secondary light, and
wherein the degree of reflectance for an angle of incidence of the primary light or an angle of emittance of the secondary light in a range from 60 degrees to a normal line at a wavelength of 440 nm to 460 nm is at most half as large as the degree of reflectance in the wavelength range between 500 to 700 nm.

13. The lighting device of claim 12, further comprising an optics downstream of the light conversion element that captures and emits the secondary light.

14. The lighting device of claim 12, wherein the light emitting unit comprises a device selected from a group consisting of a laser light source that emits the primary light, a light guide that emits the primary light, a fiber optic light guide that emits the primary light, a lens that emits the primary light, and any combinations thereof.

15. The lighting device of claim 12, wherein the light emitting unit emits the primary light along an optical axis that, in relation to an axis of a normal line to the light conversion element and/or in relation to an optical axis of the secondary light, has an angle of greater than 30 degrees with a scattering range around the optical axis of ±5 degrees.

16. The lighting device of claim 12, wherein the light emitting unit emits the primary light as a bundled primary light with a wavelength between 440 nm to 460 nm and the light conversion element emits the secondary light with a wavelength range in a visible light region.

17. The lighting device of claim 12, wherein the secondary light, in in a hot operating state of the lighting device, lies in an ECE range.

18. A method for producing a light conversion device, comprising:
providing a base body on a back side of a light conversion element; and
coating a front side of the light conversion element with at least one coating layer in such a manner that light of a specific wavelength, irradiated along an optical axis onto the front side of the light conversion device has a first degree of reflectance and in such a manner that light of another wavelength or of a wavelength range irradiated along the optical axis onto the front side has a second degree of reflectance,
wherein the light conversion device has a differing degree of reflectance depending on a direction of an incident beam of the primary light or an emitted beam of the secondary light, and
wherein the degree of reflectance for an angle of incidence of the primary light or an angle of emittance of the secondary light in a range from 60 degrees to a normal line at a wavelength of 440 nm to 460 nm is at most half as large as the degree of reflectance in the wavelength range between 500 to 700 nm.

* * * * *